United States Patent [19]

Blum et al.

[11] Patent Number: 4,853,433

[45] Date of Patent: Aug. 1, 1989

[54] EPOXY RESIN MATERIALS HAVING AN IMPROVED SHELF LIFE

[75] Inventors: Rainer Blum, Ludwigshafen; Gerd Rehmer, Bobenheim-Roxheim; Rolf Osterloh, Erftstadt; Hans Sander, Ludwigshafen, all of Fed. Rep. of Germany

[73] Assignee: BASF Aktiengesellschaft, Ludwigshafen, Fed. Rep. of Germany

[21] Appl. No.: 176,660

[22] Filed: Apr. 1, 1988

[30] Foreign Application Priority Data

Apr. 9, 1987 [DE] Fed. Rep. of Germany ....... 3712017

[51] Int. Cl.$^4$ .................. C08L 51/06; C08L 63/02
[52] U.S. Cl. ...................................... 525/65; 525/119
[58] Field of Search ................... 525/65, 119; 523/407

[56] References Cited

U.S. PATENT DOCUMENTS

| | | | |
|---|---|---|---|
| 3,222,240 | 12/1965 | Heppolette | 525/65 |
| 3,223,655 | 12/1965 | Murdock | 525/65 |
| 3,305,601 | 2/1967 | Hicks | 525/119 |
| 4,102,942 | 7/1978 | Smith et al. | 528/365 |
| 4,128,521 | 12/1978 | Kroker et al. | 523/455 |
| 4,688,054 | 8/1987 | Inamoto et al. | 525/65 |

FOREIGN PATENT DOCUMENTS

| | | | |
|---|---|---|---|
| 62-104888 | 5/1987 | Japan | 525/65 |
| 87/00188 | 1/1987 | PCT Int'l Appl. | 525/65 |

*Primary Examiner*—Allan M. Lieberman
*Assistant Examiner*—Robert E. L. Sellers, II
*Attorney, Agent, or Firm*—Keil & Weinkauf

[57] ABSTRACT

Epoxy resin materials essentially contain (A) an epoxy resin having a mean molecular weight of from 300 to 6,000 and on average from 1.5 to 3.0 epoxy groups in the molecule and (B) a polyacrylate resin obtainable by polymerization of essentially (b$_1$) from 30 to 95% by weight of esters of acrylic acid and/or methacrylic acid and/or ethylacrylic acid with $C_1$-$C_{20}$-alcohols in the presence of (b$_2$) from 5 to 70% by weight of carboxyl-containing copolymers having a mean molecular weight of from 500 to 20,000, obtainable by bulk or solution polymerization and are used for heat-curable finishes, adhesive bonds and coatings.

7 Claims, No Drawings

EPOXY RESIN MATERIALS HAVING AN IMPROVED SHELF LIFE

The present invention relates to epoxy resin materials essentially containing (A) an epoxy resin having a mean molecular weight of from 300 to 6,000 and on average from 1.5 to 3.0 epoxy groups in the molecule and (B) a polyacrylate resin obtainable by polymerization, in an organic solvent or solvent mixture, of essentially ($b_1$) from 30 to 95% by weight of esters of acrylic acid and/or methacrylic acid and/or ethylacrylic acid with $C_1$–$C_{20}$-alcohols in the presence of ($b_2$) from 5 to 70% by weight of carboxyl-containing copolymers having a mean molecular weight of from 500 to 20,000, obtainable by bulk or solution polymerization at a temperature of from 180° to 400° C. and a pressure of from 1 to 200 bar of monoolefinically unsaturated monomers containing a monoolefinically unsaturated carboxylic acid selected from the proup consisting of acrylic acid, methacrylic acid, ethylacrylic acid, maleic acid, $C_1$–$C_4$ monoalkyl esters of maleic acid, fumaric acid, and $C_1$–$C_4$ monoalkyl ester of fumaric acid, and their use for heat-curable surface finishes, adhesive bonds and coatings.

Combinations of carboxyl-containing polyacrylates and epoxy resins as binders for heat-curable finishes are known.

Thus, German Pat. No. 2,635,177 describes baking finishes which have a low solvent content and consist of carboxyl-containing acrylate resins based on a copolymer, which contains from 10 to 35% by weight of $\alpha,\beta$-unsaturated carboxylic acids, and an epoxy resin which contains 2 or more oxirane groups per molecule. These finishes may also contain conventional catalysts, such as tertiary amines or quaternary ammonium salts, and conventional assistants, such as leveling agents, dispersants or thixotropic agents.

U.S. Pat. No. 3,305,601 describes a film-forming composition of a carboxyl-containing copolymer, a polyepoxide and a catalyst, the said composition being curable at as low as room temperature.

German Pat. No. 2,734,167 describes a process for the production of overcoats from coating materials consisting of carboxyl-containing copolymers, aliphatic polyepoxides, catalysts and other additives are used.

Although the quality of the overcoats produced from these coating materials is very high and it is desired to use these coating materials in general industrial coatings, in particular for corrosion protection coatings and coatings for household appliances, they have not been very widely used to date.

This is because of the poor shelf life, particularly of the catalyzed mixtures, which slowly react with one another at as low as room temperature. Such coating materials therefore cannot be used in coating systems having ring lines and storage containers.

It is an object of the present invention to provide heat-curable epoxy resin coating materials for high quality surface finishes, adhesive bonds and coatings, which have a long shelf life.

We have found that this object is achieved by epoxy resin materials essentially containing (A) an epoxy resin having a mean molecular weight of from 300 to 6,000 and on average from 1.5 to 3.0 epoxy groups in the molecule and (B) polyacrylate resin obtainable by polymerization, in an organic solvent or solvent mixture, of essentially ($b_1$) from 30 to 95% by weight of esters of acrylic acid and/or methacrylic acid and/or ethylacrylic acid with $C_1$–$C_{20}$-alcohols in the presence of ($b_2$) from 5 to 70% by weight of carboxyl-containing copolymers having a mean molecular weight of from 500 to 20,000, obtainable by bulk or solution polymerization at a temperature of from 180° to 400° C. and a pressure of from 1 to 200 bar of monoolefinically unsaturated monomers containing a monoolefinically unsaturated carboxylic acid selected from the group consisting of acrylic acid, methacrylic acid, ethylacrylic acid, maleic acid, $C_1$–$C_4$ monoalkyl esters of maleic acid, fumaric acid, and $C_1$–$C_4$ monoalkyl ester of fumaric acid.

Conventional resins can be used as epoxy resins (A), provided that they have a mean molecular weight ($\overline{M}_n$) of from 300 to 60,000 and contain an average from 1.5 to 3.0 epoxy resin groups per molecule, preferably compounds having two epoxy groups per molecule.

Preferred epoxy resins are those having mean molecular weights ($\overline{M}_n$) of from 350 to 5,000, in particular from 350 to 2,000. Particularly preferred epoxy resins are, for example, glycidyl ethers of polyphenols which contain on average two or more phenolic hydroxyl groups per molecule and can be prepared in a conventional manner by etherification with an epihalohydrin in the presence of an alkali. Examples of suitable phenol compounds are 2,2-bis-(4-hydroxyphenyl)-propane (bisphenol A), 4,4'-dihydroxybenzophenone, 1,1-bis-(4-hydroxyphenyl)-ethane, 1,1-bis-(4-hydroxyphenyl)-isobutane, 2,2-bis-(4-hydroxytert-butylphenyl)-propane, bis-(2-hydroxynaphthylmethane) and 1,5-dihydroxynaphthalene. In some cases, it is desirable to use aromatic epoxy resins having a fairly high molecular weight. These are obtained by reacting the abovementioned diglycidyl ethers with a polyphenol, for example 2,2-(bis-4-hydroxyphenyl)-propane, and then further reacting the resulting products with epichlorohydrin to prepare polyglycidyl ethers.

Suitable monomers ($b_1$) are esters of acrylic acid, methacrylic acid or ethylacrylic acid with aliphatic $C_1$–$C_{20}$-alcohols, preferably $C_1$–$C_8$-alcohols, such as methyl acrylate, methyl methacrylate, methyl ethacrylate, ethyl acrylate, ethyl methacrylate, propyl acrylate, propyl methacrylate, n-butyl acrylate, sec-butyl acrylate, isobutyl acrylate, tert-butyl acrylate, n-butyl methacrylate, sec-butyl methacrylate, isobutyl methacrylate, tert-butyl methacrylate, n-butyl ethacrylate, 2-ethylhexyl acrylate, 2-ethylhexyl methacrylate, lauryl acrylate, lauryl methacrylate, octadecyl acrylate, octadecyl methacrylate, methylglycol acrylate, methylglycol methacrylate, ethylglycol acrylate, ethylglycol methacrylate, n-propylglycol acrylate, n-propylglycol methacrylate, isopropylglycol acrylate, isopropylglycol methacrylate, n-butylglycol acrylate, n-butylglycol methacrylate, sec-butylglycol acrylate, isobutylglycol acrylate, tert-butylglycol acrylate, sec-butylglycol methacrylate, isobutylglycol methacrylate and tert-butylglycol methacrylate, and with cycloaliphatic $C_6$–$C_{20}$-alcohols, preferably $C_6$–$C_{10}$-alcohols, such as cyclohexyl acrylate, cyclohexyl methacrylate 4-tert-butylcyclohex-1-yl acrylate, 2-decalyl acrylate and tetrahydrofurfuryl acrylate, and with aromatic $C_6$–$C_{20}$-alcohols, such as phenyl acrylate, phenyl methacrylate and anisyl acrylate, and with araliphatic $C_7$–$C_{20}$-alcohols, such as benzyl acrylate, benzyl methacrylate, β-phenylethyl acrylate and β-phenoxyethyl acrylate.

Other suitable monomers are monoesters of acrylic acid, methacrylic acid or ethyl acrylic acid with dihydric to hexahydric $C_2$–$C_{18}$-alcohols, preferably $C_2$–$C_8$-alcohols, such as β-hydroxyethyl acrylate, β-hydroxyethyl methacrylate, propylene glycol monoacrylate, propylene glycol monomethacrylate, butane-1,4-diol monoacrylate, butane-1,4-diol monomethacrylate, pentane-1,5-diol monoacrylate, pentane-1,5-diol monomethacrylate, hexane-1,6-diol monoacrylate, hexane-1,6-diol monomethacrylate, glycerol monoacrylate, glycerol monomethacrylate, trimethylolpropane monoacrylate, trimethylolpropane monomethacrylate, pentaerythritol monoacrylate, pentaerythritol monomethacrylate, 1,4-cyclohexanedimethanol monoacrylate and 1,4-cyclohexanedimethanol monomethacrylate.

Methylmethacrylate, n-butyl acrylate, n-butyl methacrylate, tert-butyl acrylate, tert-butyl methacrylate, isobutyl acrylate, isobutyl methacrylate, ethylhexyl acrylate, ethylhexyl methacrylate and hydroxyethyl acrylate are preferred.

Component ($b_1$) is used in an amount of from 30 to 95, preferably from 50 to 80, % by weight.

Suitable monoolefinically unsaturated monomers for the preparation of the copolymers ($b_2$) are vinylaromatics, such as styrene, α-methylstyrene, chlorostyrene, vinyltoluene or tert-butylstyrene, acrylic acid, methacrylic acid and ethylacrylic acid, and esters of these acids with $C_1$–$C_{20}$-alcohols, as are described, for example, for component ($b_1$), monoesters of these acids with dihydric to hexahydric alcohols, as described, for example, for component ($b_1$), maleic acid, fumaric acid and their $C_1$–$C_4$-mono- and -dialkyl esters, acrylonitrile, methacrylonitrile, acrylamidomethylol ether, methacrylamidomethylol ether, acrylamide, methacrylamide, glycidyl acrylate and glycidyl methacrylate, vinyl esters of $C_2$–$C_4$-carboxylic acids, such as vinyl acetate and vinyl propionate, and vinyl ethers of 3 to 10 carbon atoms, vinyl halides, such as vinyl chloride and vinylidene chloride.

Preferred monomers are styrene, acrylic acid, methacrylic acid, methyl methacrylate, n-butyl acrylate, tert-butyl acrylate, tert-butyl methacrylate and 2-ethylhexyl acrylate.

Carboxyl-containing copolymers ($b_2$) are prepared by a known method of bulk polymerization or solution polymerization, as described in, for example, German Laid-Open Application DOS No. 3,225,875, at from 180° to 400° C., preferably from 200° to 350° C., particularly preferably from 200° to 300° C., under from 1 to 200, preferably from 20 to 50, bar in the presence or absence of high boiling solvents, such as mixtures of aromatics having a boiling range of from 155° to 185° C., and in the presence or absence of polymerization initiators and regulators. The copolymers ($b_2$) have mean molecular weights (number average) of from 500 to 20,000, preferably from 1,000 to 10,000, and hydrogenation iodine numbers (DIN 53,241) of from 1.3 to 51, preferably from 2.5 to 25.4.

Other suitable comonomers (2) employed in the preparation of copolymer ($b_2$) are styrene, α-methylstyrene, chlorostyrene, vinyltoluene, tert-butylstyrene, acrylamidomethylol ether, methacrylamidomethylol ether, acrylic acid, methacrylic acid and ethylacrylic acid, as well as maleic acid, fumaric acid and their $C_1$–$C_4$-mono- and -dialkyl esters, maleic anhydride, acrylonitrile, acrylamide or methacrylamide, and polyolefinically unsaturated compounds such as butadiene or isoprene in amounts of from 0 to 50% by weight. Where they are present, amounts of from 5 to 50, preferably from 10 to 40, % by weight have proven suitable.

In the preparation of component (B) by solution polymerization, copolymer ($b_2$) is generally dissolved before the reaction. It may be dissolved in the solvent used for the polymerization or in a monomer or monomer mixture.

Copolymer ($b_2$) is used in amounts of from 5 to 70, preferably from 20 to 50, % by weight.

Components (A) and (B) are mixed at from 20° to 50° C. using the solvents employed for the preparation of component (B).

The epoxy resin materials generally have a solids content of from 50 to 80, preferably from 70 to 80, % by weight and viscosities of from 1,000 to 3,000 mPa.s (20° C.).

The epoxy resin materials can be combined with suitable catalysts and assistants to give surface finishing, coating and adhesive bonding materials.

|  | Example 1 (according to the invention) | Example 2 (Comparative Example) |
|---|---|---|
| Styrene | 116 g | 490 g |
| Butyl acrylate | 350 g | 350 g |
| Methacrylic acid | — | 160 g |
| Copolymer prepared from 70% by weight of styrene and 30% by weight of methacrylic acid, having a mean molecular weight of 2,450 (dissolved in the other components of feed I) | 534 g | — |
| Aromatics Boiling range 155–185° C. Feed II: | 250 g | 250 g |
| Tert-butyl perbenzoate Feed III: | 40 g | 40 g |
| Tert-butyl peroctoate Initially taken substance | 10 g | 10 g |
| Methoxypropyl acetate | 315 g | 315 g |

The initially taken substance was heated to 160° C. in a reaction vessel, after which feeds I and II were added in the course of 2 hours, the temperature being 152°–158° C. Stirring was continued for a further hour at 155°–158° C., after which feed III was added in the course of one hour and polymerization was continued for a further hour.

Characteristic data of the polymer solutions:

|  | Example 1 | Example 2 |
|---|---|---|
| Efflux time, cup 4 [s] (DIN 53,211) | 214 | 286 |
| Nonvolatile fractions [% by wt.] (DIN 53,216) | 65 | 65 |
| K value (cf. DIN, 53,720) 3% strength in acetone | 15.2 | 14.5 |
| Appearance | Cloudy | Clear |

Testing the polymer solutions 112 g of the polymer solutions of Examples 1 and 2 were mixed with 83 g of epoxy resin based on bisphenol A, having an epoxide equivalent weight of about 190 (Epikote 828, Shell), and 6.5 g of a 10% strength by weight solution of tetrabutylammonium iodide in butanol.

Test films are prepared from these solutions by applying them to degreased steel sheets using a knife coater and baking at 160° C. for 20 minutes. The film quality and viscosity of the solutions over the storage time were observed.

| Storage time | Fresh | | 5 days | | 3 weeks | | 7 weeks | | 17 weeks | | 30 weeks | |
|---|---|---|---|---|---|---|---|---|---|---|---|---|
| Example | 1 | 2 | 1 | 2 | 1 | 2 | 1 | 2 | 1 | 2 | 1 | 2 |
| Efflux time D 4 [s] (DIN 53,211) | 86 | 134 | 85 | 159 | 87 | 418 | 85 | gelled | 85 | — | 97 | — |
| Pendulum hardness (DIN 53,157) | 138 | 124 | 143 | 122 | 136 | 134 | 135 | 129 | 143 | — | 127 | — |
| Indentation (DIN 53,156) | 8.6 | 7.9 | 8.4 | 8.6 | 8.8 | 9.3 | 9.9 | 9.3 | 9.1 | — | 9.4 | — |

All films are clear and glossy.

At the beginning of the shelf life test, the polymer solutions give coating films of comparable quality. After only 3 weeks, the viscosity of Example 2 (Comparative Example) is found to have increased to such an extent that this solution would no longer be sprayable. After storage for 17 and 30 weeks, the viscosity and coating quality of Example 1 is virtually unchanged, whereas Example 2 is found to have gelled after 7 weeks in the bottle.

We claim:

1. An epoxy resin material containing
   (A) an epoxy resin having a mean molecular weight of from 300 to 6,000 and on average from 1.5 to 3.0 epoxy groups in the molecule and
   (B) a polyacrylate resin obtainable by polymerization, in an organic solvent or solvent mixture, of
   ($b_1$) from 30 to 95% by weight of esters of acrylic acid or methacrylic acid or ethylacrylic acid, or a mixture of these, with $C_1$–$C_{20}$-alcohols in the presence of
   ($b_2$) from 5 to 70% by weight of carboxyl-containing copolymers having a mean molecular weight of from 500 to 20,000, obtainable by bulk or solution polymerization at a temperature of from 180° to 400° C. and a pressure of from 1 to 200 bar of monoolefinically unsaturated monomers containing a monoolefinically unsaturated carboxylic acid selected from the group consisting of acrylic acid, methacrylic acid, ethylacrylic acid, maleic acid, $C_1$–$C_4$ monoalkyl esters of maleic acid, fumaric acid, and $C_1$–$C_4$ monoalkyl ester of fumaric acid.

2. An epoxy resin material as claimed in claim 1, containing
   (A) an epoxy resin having a mean molecular weight of from 300 to 6,000 and on average from 1.5 to 3.0 epoxy groups in the molecule and
   (B) a polyacrylate resin obtainable by copolymerization, in an organic solvent or solvent mixture, of
   ($b_1$) from 30 to 90% by weight of esters of acrylic acid or methacrylic acid or ethylacrylic acid, or a mixture of these, with $C_1$–$C_{20}$-alcohols in the presence of
   ($b_2$) from 5 to 70% by weight of carboxyl-containing copolymers having a mean molecular weight of from 500 to 20,000, obtainable by bulk or solution polymerization at a temperature of from 180° to 400° C. and a pressure of from 1 to 200 bar of (1) from 50 to 95% by acid, ethylacrylic acid, maleic aced, $C_1$–$C_4$ monoalkyl esters of maleic acid, fumaric acid, and $C_1$–$C_4$ monoalkyl esters of fumaric acid, and (2) from 5 to 50% by weight of comonomers other than monomers (1).

3. An epoxy resin material as claimed in claim 1, containing a polyacrylate resin (B) which contains monoesters of acrylic acid or methacrylic acid or ethylacrylic acid, or a mixture of these, with monohydric or hexahydric aliphatic, cycloaliphatic or aromatic alcohols, or a mixture of these, as copolymerized component ($b_1$).

4. An epoxy resin material as claimed in claim 1, containing a polyacrylate resin (B) which contains, as copolymerized monoolefinically unsaturated monomers for copolymers ($b_2$), predominant amounts of styrene and minor amounts of acrylic acid, methacrylic acid, maleic acid, maleic anhydride or esters of said acids with $C_1$–$C_{20}$-alcohols.

5. An epoxy resin material as claimed in claim 2, containing a polyacrylate resin (B) which contains styrene, α-methylstyrene, chlorostyrene, vinyltoluene, tert-butylstyrene, maleic anhydride, acrylonitrile, acrylamide, methacrylamide, acrylamidoalkylol ethers or methacrylamidoalkylol ethers as copolymerized comonomers (2).

6. A surface finishing, coating or adhesive bonding material containing an epoxy resin material as claimed in claim 1.

7. A coated article obtainable using a surface finishing or coating material as claimed in claim 6.

* * * * *